(12) United States Patent
Wipenmyr et al.

(10) Patent No.: US 8,633,685 B2
(45) Date of Patent: Jan. 21, 2014

(54) SYSTEM AND METHOD FOR MEASURING ALIGNMENT ERRORS OF SHAFTS

(75) Inventors: Jan Wipenmyr, Gothenburg (SE); Christer Johansson, Gothenburg (SE); Christian Jonasson, Gothenburg (SE)

(73) Assignee: Elos Fixturlaser AB, Molndal (SE)

( * ) Notice: Subject to any disclaimer, the term of this patent is extended or adjusted under 35 U.S.C. 154(b) by 758 days.

(21) Appl. No.: 12/663,291

(22) PCT Filed: Jul. 17, 2008

(86) PCT No.: PCT/SE2008/000456
§ 371 (c)(1), (2), (4) Date: Dec. 7, 2009

(87) PCT Pub. No.: WO2009/011638
PCT Pub. Date: Jan. 22, 2009

(65) Prior Publication Data
US 2010/0171488 A1   Jul. 8, 2010

(30) Foreign Application Priority Data
Jul. 18, 2007   (SE) ........................................ 0701758

(51) Int. Cl.
*G01B 7/00* (2006.01)
*G01R 33/025* (2006.01)

(52) U.S. Cl.
USPC ...................... 324/202; 324/207.12

(58) Field of Classification Search
USPC .......................... 324/207.2, 207.12
See application file for complete search history.

(56) References Cited

U.S. PATENT DOCUMENTS

| 5,864,192 A | 1/1999 | Nagate et al. |
| 2002/0158627 A1 | 10/2002 | Dordet et al. |

FOREIGN PATENT DOCUMENTS

| CN | 1045850 C | 10/1999 |
| EP | 0 178 780 | 4/1986 |
| GB | 2 321 969 A | 8/1998 |
| GB | 2 360 596 A | 9/2001 |
| WO | WO 96/01410 | 1/1996 |

OTHER PUBLICATIONS

International Search Report, corresponding to PCT/SE2008/000456, mailed Dec. 3, 2008.
"Application of gravitation accelerometer in measuring gradient", XUE Renxia, pp. 40-45 of Sensor Technology, vol. 17, period 2, 1998.

*Primary Examiner* — Reena Aurora
(74) *Attorney, Agent, or Firm* — Renner, Otto, Boisselle & Sklar, LLP

(57) ABSTRACT

The invention concerns a system for measuring the alignment error of two axles provided with a first and a second coupling part by means of a biaxial orthogonal magnetic sensor system comprising a sensor and a magnet, wherein said sensor is designed to be placed on the first coupling part with its one direction of sensing oriented in one direction of magnetization of said magnet, which magnet is designed to be placed on the other coupling part and means for reading off an angle error and offset error independently of each other during the rotation of the axles on-line. The system moreover includes a reference sensor for determining said angle error and offset error orientation relative to a known direction.

30 Claims, 3 Drawing Sheets

SYSTEM AND METHOD FOR MEASURING ALIGNMENT ERRORS OF SHAFTS

TECHNICAL FIELD

The present invention concerns a system, a method and layout for measuring the collinearity of two axles.

BACKGROUND OF THE INVENTION

Today there is a great need to measure the degree of alignment of two axle couplings on-line, i.e., during operation. By having the axles oriented in a collinear direction (in line with the directions of symmetry of the axles), one achieves fewer energy losses when the electrical machine is driving a pump via axle and axle coupling, and also the wear on the axles, couplings, and electrical machines is minimized. The measurement and subsequent orienting is done today with laser-based systems when the axles are stationary. However, it is known that the collinearity of the axles during operation, on account of the loading and temperature changes, differs from the condition when they are standing still. Likewise, the orientation changes over time during operation. Therefore, there is great interest in a number of different branches of industry in on-line measurement of axles and axle couplings in order to make possible an orientation which coincides with the conditions during operation.

The environmental aspects in the industry with temperatures in axle couplings of up to 150° C. and the dirty environment dictate the use of a sensor system which can handle these requirements. Magnetic sensors are popular today, for example in the automotive industry, where one can find such an environment.

GB 2360596 and GB 2321969 deal with axle orientation layouts.

SUMMARY OF THE INVENTION

The present invention is based on a robust magnetic method for measuring the orientation error of axle couplings.

Accordingly, a system is obtained for measuring the alignment of two axles, provided with a first and a second coupling part, by means of a biaxial orthogonal magnetic sensor system comprising a sensor and a magnet. Said sensor is designed to be placed on the first coupling part with its one direction of sensing oriented in one direction of magnetization of said magnet. The magnet is designed to be placed on the other coupling part and means for reading off an angle error and offset error independently of each other during the rotation of the axles on-line. The system moreover includes a reference sensor for determining said angle error and offset error orientation relative to a known direction.

The invention also concerns a biaxial orthogonal magnetic sensor system comprising a sensor and a magnet for use in a system as above.

The invention also concerns a reference sensor for use in a system as above.

The invention also concerns a method for measurement of the relative parallel change in distance between the couplings by means of a system per the above, in that one studies the change of a working point, i.e., the mean value of the field changes obtained by rotation of the axles.

BRIEF DESCRIPTION OF THE DRAWINGS

The invention is described below in regard to a number of nonlimiting embodiments illustrated in the accompanying drawings, where.

DETAILED DESCRIPTION OF THE PREFERRED EMBODIMENTS

The orientation error of the axle coupling can be divided into an angle error and an offset error. We shall now describe the various cases and how these errors can be measured independently of each other. An axial shifting of the axles can also occur, and it can also be measured with the method of the invention.

The method is based on placing a permanent magnet (e.g., made of NdFeB alloy, in order to achieve a strong enough magnetic field) on one of the couplings and a biaxial (measuring the magnetic field in two orthogonal directions) magnetic sensor on the other coupling. The dimension of the magnets is chosen such that one obtains a sufficiently strong magnetic field, on the one hand, yet one also obtains a sufficiently strong magnetic field gradient where the magnetic sensor system is placed. The direction of magnetization of the magnet will point toward the one coupling. One sensing direction of the magnetic sensor system will point toward the direction of magnetization of the magnet and the other sensing direction will be oriented orthogonally to the other sensing direction.

Figure 1:
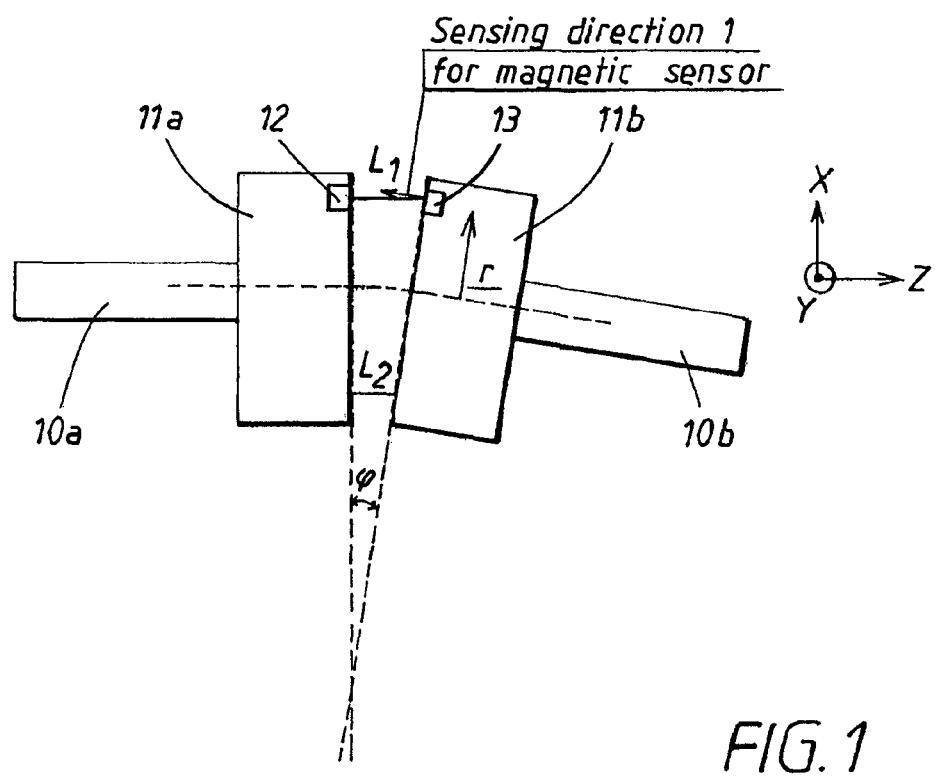
FIG. 1 shows an embodiment of an axle measurement layout according to the invention.

The axle coupling with an angle error $\phi$ can be seen in FIG. 1, which shows two axles 10a and 10b with corresponding coupling units 11a and 11b. Coupling unit 11a is provided with a magnet 12 and coupling unit 11b is provided with a magnetic sensor 13. The axial distance r is the distance from the centre of the axle to the magnet 12 and the magnetic sensor 13. The figure shows an angle error producing a maximum distance between the magnet and the magnetic sensor pointing straight up. The distance $L_1$ and $L_2$ is the maximum and minimum distance between magnet and magnetic sensor. When the coupling rotates, the distance between magnet and magnetic sensor will describe an oscillating motion with peak to peak value $L_1$-$L_2$. The angle error is given by:

$$\sin(\varphi/2) = \frac{(L_1 - L_2)}{4r} \quad (1)$$

For small angle errors (when $\phi \ll 1$), the angle error is given by:

$$\varphi = \frac{(L_1 - L_2)}{2r} \quad (2)$$

Figure 2:
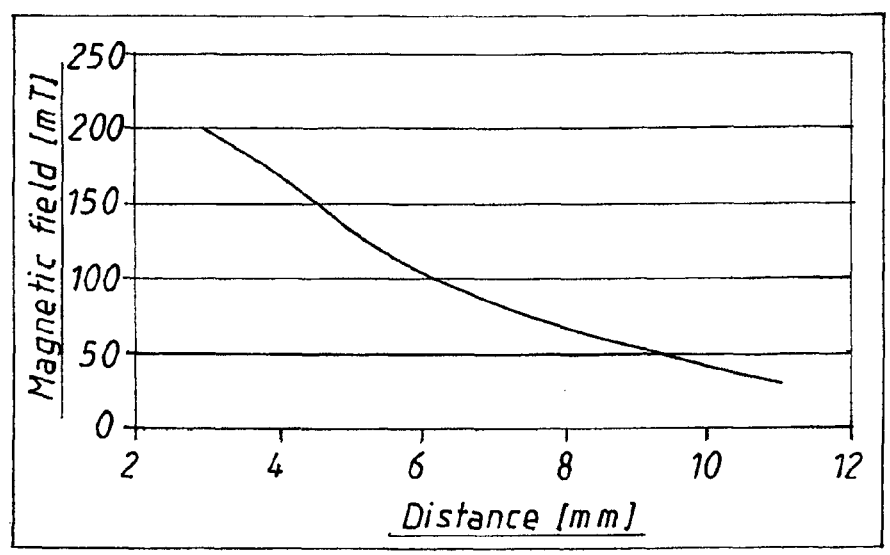
FIG. 2 shows a typical appearance of how the magnetic field varies with distance from a magnet.

FIG. 2 shows how the magnetic field varies with distance from the magnet for the magnet used in the coupling. A slight change in position of the distance between permanent magnet and sensor will produce a field change that depends on the magnitude of the change in position and the gradient (the inclination in the magnetic field with respect to the distance curve, as below).

The biggest change in position which occurs in our measurement layout upon rotation of the coupling is given by $L_1-L_2$, which corresponds to a magnetic field with minimum value $B_{min}$ or maximum value $B_{max}$. The field change, $B_{max}-B_{min}$, is the peak to peak value, $B_{tt1}$, of the oscillating magnetic field values upon rotation of the coupling when an angle error is present. Since the changes in position are slight (i.e., a constant gradient) upon rotation of the coupling, $B_{tt1}$ can be written as (taking into account the fact that the magnetic sensor is also turning with an angle equal to the angle error):

$$B_{tt1} = B_{1max} - B_{1min} = \frac{\partial B_1}{\partial L}(L_1 - L_2)\cos(\varphi) = \frac{\partial B_1}{\partial L}4r\sin(\varphi/2)\cos(\varphi) \quad (3)$$

where ∂B/∂L is the gradient at the working point. If we then allow for the fact that we have slight angle errors, i.e., $\sin(\phi/2)\cos(\phi)\approx\phi/2$ when $\phi\ll 1$, we obtain:

$$B_{tt1} = \frac{\partial B_1}{\partial L}(2r)\varphi \quad (4)$$

The peak to peak value of the oscillation of the magnetic field is thus linear to the absolute value of the angle field for small angle errors, which is the case in most angle errors. If the angle error were larger (i.e., $\phi$ is not $\ll 1$), one can only use the complete expression for the angle change (equation 2.3) or, if the angle error is quite large (and neither is the gradient constant), use the result for how the field varies with distance and then calculate the angle error (i.e., use the result from FIG. 2).

All measurement results obtained for relatively large error in these axle coupling layouts confirm that $B_{tt1}$ is linear with respect to the angle error.

From a typical linear magnetic sensor, e.g., from an integrated Hall sensor with voltage measurement), one obtains an output voltage which is linear with respect to the magnetic field. Since the distance between magnet and magnetic sensor will oscillate with a sine (or cosine) expression upon rotation of the coupling and the changes in distance are not too large, we will obtain an oscillating expression for the voltage signal from the magnetic sensor:

$$V_1 = \left(\frac{V_{n1}}{2}\right)\sin(\theta + \alpha_1) + V_{off1} \quad (5)$$

where $\theta$ is the angle of rotation, $\alpha 1$ is the phase, $V_{off1}$ is an offset in the output signals (which depends on the working distance between magnet and magnetic sensor) and $V_{tt1}$, is the peak to peak value of the voltage. Fitting the above equation to the data measured upon rotation gives the value for the parameters $V_{tt1}$ $\alpha_1$ and $V_{off1}$. From the phase in relation to a reference signal (e.g., from an accelerometer or another reference sensor system placed in connection with the magnetic sensor system), one can then divide the angle error into components (horizontal and vertical error). From $V_{off1}$, one can determine any shifting in the distance between the couplings, which will produce changes in the working distance. Using $V_{off1}$, one can thus compensate for these changes in working distance, which means that one can also detect any relative changes in position between the two couplings with this method.

Since the magnetic field can be converted into a voltage value for the magnetic sensor, the peak to peak value in the magnetic field can be converted into a peak to peak value in the output voltage from the magnetic sensor:

$$V_{u1} = k_1\phi + V_{10} \quad (6)$$

Figure 3:
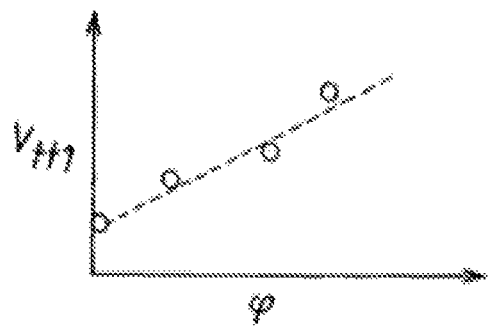
FIG. 3 shows a typical appearance of how the peak to peak value of a signal from sensing direction 1 varies with the absolute value of the angle error.

This is shown schematically in FIG. 3.

The calibration constant $k_1$ contains the value of the gradient and the radius of the coupling as in equation 2.4. There is very little dependent upon the offset in this calibration constant. This component has been measured and found to be negligible for the offsets which occur in most coupling applications. $V_{10}$ is used to obtain a good calibration line and is usually rather close to zero. To calibrate this system for angle error, one thus needs at least two data points, at least one small one and a larger angle error. Several data points during the calibration phase provide a more precise calibration. Preferably, one should then select small, medium and large angle errors.

Figure 4:
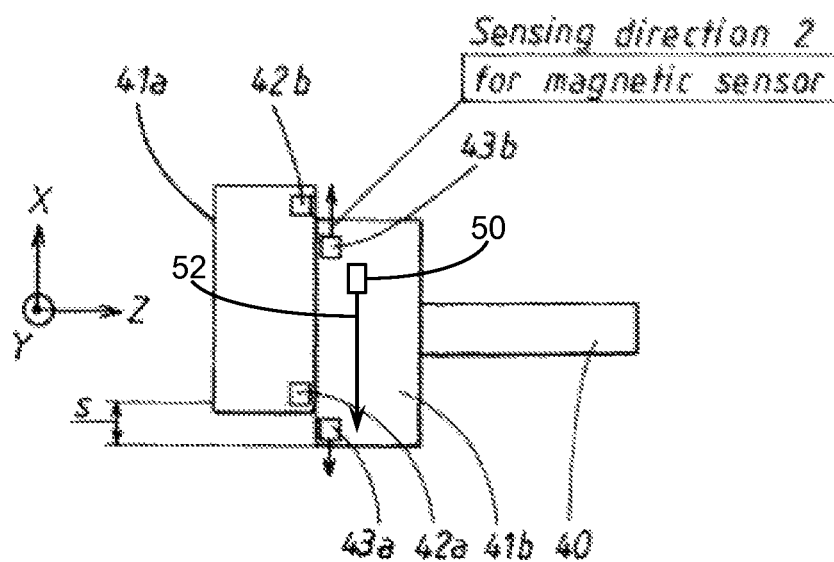
FIG. 4 shows the offset error and the sensor system of the invention.

An offset error of the coupling and how the sensor system is positioned can be seen in FIG. 4, which shows one of two axles 40 with corresponding coupling units 41a and 41b. The coupling unit 41a is provided with magnets 42a and 42b and the coupling unit 41b is provided with magnetic sensors 43a and 43b.

Given an offset error and given rotation of the coupling, the magnetic sensor will rotate above the magnet. The magnet can be locked into a fixed system of coordinates. The offset can be seen as the resulting shift of position in the plane of rotation between the centre of the magnet and the magnetic sensor system. If one uses a magnetic sensor with a sensing direction oriented radially as in FIG. 4 (the sensing direction is oriented radially to minimize the effect of play in the coupling), this sensing direction will be projected along the magnetic field lines oriented in the plane of the magnet. This oscillation and projection of the sensing direction will entail an oscillating signal from the magnetic sensor. The magnetic field value oriented in such a plane of rotation depends on the degree of offset. This will mean that the sensor's peak to peak value (for sensing direction 2, FIG. 4) for a magnetic sensor oriented in this radial direction will then depend on the degree of offset. The arrow in the drawing indicates sensing direction 2 for the magnetic sensor. The lower part of the drawing shows how the system of magnet and magnetic sensor is positioned in relation to each other when the coupling rotates a half turn. An oscillating signal pattern is obtained upon rotation of the coupling similar to the oscillations for an angle error, but in this case one gets signal oscillations about a null signal (for a perfectly centred position of the magnet/magnetic sensor system with offset=0). The same type of signal processing is used in this offset error as in the previously described procedure (see the description of the angle error).

The peak to peak value of the magnetic field can be written as $$B_{u2} = k_S S \quad (7)$$

where S is the value of the offset and $k_S$ is a calibration coefficient for the offset.

Upon rotation of the coupling, one obtains a sine signal (the same way as for the angle error), which can be written as:

$$V_2 = \left(\frac{V_{tt2}}{2}\right)\sin(\theta + \alpha_2) + V_{off2} \quad (8)$$

with corresponding peak to peak value of output signal $V_{tt2}$, a relative phase angle $\alpha_2$, and a constant offset fitting parameter $V_{off2}$. Just as before with the angle error, this peak to peak value for the offset can be written as:

$$V_{tt2} = k_2 S + V_{20} \quad (9)$$

Figure 5:
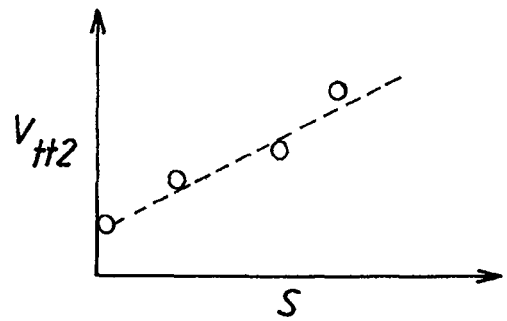
FIG. 5 shows the typical appearance of how the peak to peak value of a signal from sensing direction 2 varies with the absolute value of the offset error.

This is shown schematically in FIG. 5.

Just as for the angle error, the offset error result has to be calibrated with at least two data points, a small offset error and a larger offset error. Several data points during this calibration process produce a more accurate calibration.

Figure 6:
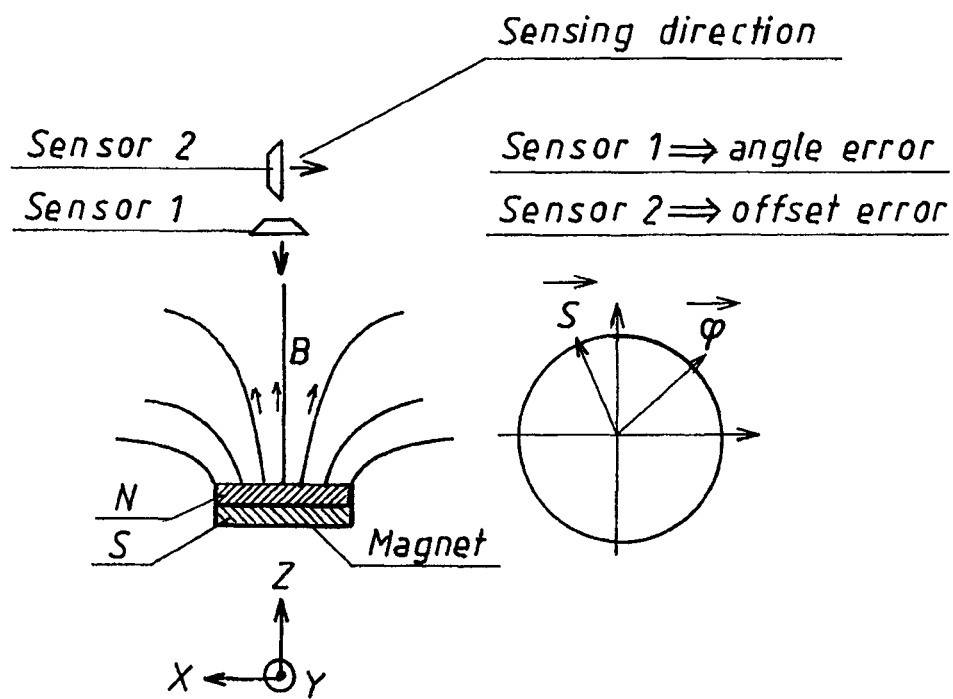
FIG. 6 shows two absolute errors in angle and offset as vectors in a system of coordinates with corresponding horizontal and vertical error.

According to the invention, one obtains a biaxial magnetic sensor system with one sensing direction (direction 1) oriented toward the magnet and one sensing direction (direction 2) oriented radially or transversely. The angle error is measured by direction 1 and the offset error by direction 2. The two absolute errors in angle and offset can be seen as vectors in a system of coordinates with corresponding horizontal and vertical error. The overall situation is illustrated in FIG. 6.

The definitions on directions of the errors can be adapted as needed. For measurements where both angle error and offset error have changed, it has been found that there is no dependency between the two errors, which means that both angle error and offset error can be measured independently, by using data from the two sensing directions 1 and 2.

A reference sensor 50 is used to determine how the angle error and the offset error are oriented relative to a known direction. The reference sensor 50 can be placed at an arbitrary position, as long as one knows where it is placed and how it is oriented in relation to the magnetic sensor system. It can be placed advantageously in association with the magnetic sensor system, since the other electronics is placed in this region. One can use an accelerometer, for example, as the reference sensor 50, in which case one will get a maximum accelerometer signal when the sensing direction of the accelerometer points straight toward the g-vector 52 (straight down) and the signal is lowest when the sensing direction is antiparallel to the g-vector 52 (straight up). In this case, the sensing direction of the accelerometer will be oriented radially in the coupling. The sensing direction of the accelerometer can also be oriented transversely in the coupling and then one also obtains an oscillating signal, but now the signal will not be influenced by the centripetal force as in the first described case of the accelerometer. The signal from the accelerometer will also describe an essentially sinusoidal signal with similar maximum and minimum signals when the sensing direction is oriented with or in the direction of the g-vector 52. The phase of the reference signal relative to the phases of the signals from the angle error and the offset error will then describe how the angle error and the offset error are oriented relative to the g-vector 52. One can also conceive of other types of reference sensors 50, such as optical transducers or magnetic transducers where the "sender" (e.g., laser in the optical case or a magnet in the magnetic case) is fixed at one point and the detector (diode in the optical case and a magnetic sensor in the magnetic case) is placed on the rotating axle, or the sender is placed on the axle and the detector is fixed relative to the rotating axle.

The invention is not limited to the embodiments illustrated and described and can be modified and changed with advantage within the scope of the enclosed patent claims.

The invention claimed is:

1. System for measuring alignment of two shafts provided with a first and a second coupling part by means of a biaxial orthogonal magnetic sensor system comprising a sensor and a magnet, wherein said sensor is designed to be placed on the first coupling part with its one direction of sensing oriented in one direction of magnetization of said magnet, which magnet is designed to be placed on the other coupling part and means for reading of an angular error and an offset error independently of each other during the rotation of the shafts, wherein the system moreover includes a reference sensor for determining an orientation of said angular error and an orientation of said offset error relative to a known direction.

2. System according to claim 1, wherein an axial shifting of the shafts is measured.

3. System according to claim 1, wherein said magnet is a permanent magnet.

4. System according to claim 3, wherein said magnet is a NdFeB alloy.

5. System according to claim 1, wherein said magnet has a dimension such that one obtains a sufficiently strong magnetic field, on the one hand, yet one also obtains a sufficiently strong magnetic field gradient where the magnetic sensor system is placed.

6. System according to claim 1, wherein the angular error $\phi$ is given by $$\sin(\varphi/2) = \frac{(L_1 - L_2)}{4r}$$

where r is an axial distance from the centre of the shaft to the magnet and the magnetic sensor, $L_1$ and $L_2$ is the maximum and minimum distance between magnet and magnetic sensor.

7. System according to claim 1, wherein a peak to peak value $B_{tt1}$ of the oscillation of the magnetic field is linear to the absolute value of the angle field for small angular errors.

8. System according to claim 7, wherein said peak to peak value is $$B_{tt1} = B_{1max} - B_{1min} = \frac{\partial B_1}{\partial L}(L_1 - L_2)\cos(\varphi) = \frac{\partial B_1}{\partial L}4r\sin(\varphi/2)\cos(\varphi)$$

where $\partial B/\partial L$ is the gradient at the working point and $B_{max} - B_{min}$ is the field change.

9. System according to claim 1, wherein the magnetic sensor generates an output voltage which is linear with respect to the magnetic field per $$V_1 = \left(\frac{V_{tt1}}{2}\right)\sin(\theta + \alpha_1) + V_{off1}$$

where $\theta$ is the angle of rotation, $\alpha_1$ is the phase, $V_{off1}$ is an offset in the output signals and $V_{tt1}$ is a peak to peak value in the voltage.

10. System according to claim 9, wherein the phase in relation to a reference signal is used to divide the angular error into components representing a horizontal error and vertical error, and from $V_{off1}$ one determines any shifting in the distance between the coupling parts.

11. System according to claim 9, wherein one uses $V_{off1}$ to compensate for changes in working distance.

12. System according to claim 9, wherein the magnetic field is converted into a voltage value for the magnetic sensor, and the peak to peak value in the magnetic field is converted into a peak to peak value in the output voltage from the magnetic sensor per:

$$V_{tt1} = k_1 \phi + V_{10}$$

where $k_1$ is a calibration constant containing the value of the gradient and the radius of the coupling.

13. System according to claim 1, wherein, given an offset error and given rotation of the coupling, the magnetic sensor will rotate above the magnet, wherein the magnet is locked into a fixed system of coordinates, wherein the offset is taken to be a shift of position occurring in the plane of rotation between the center of the magnet and the magnetic sensor system.

14. System according to claim 13, comprising a magnetic sensor with a sensing direction oriented radially, wherein the sensing direction is projected along the magnetic field lines oriented in the plane of the magnet.

15. System according to claim 14, wherein an oscillation and projection of the sensing direction is produced, and the magnetic field value oriented in such a plane of rotation depends on the degree of offset.

16. System according to claim 15, wherein the sensor's peak to peak value for a magnetic sensor oriented in said radial direction will depend on the degree of offset and an oscillating signal pattern is generated upon rotation of the coupling and signal oscillations are produced about a null signal.

17. System according to claim 16, wherein a peak to peak value of the magnetic field is obtained as $$B_{tt2} = k_S S$$

where S is the value of the offset and $k_S$ is a calibration coefficient for the offset.

18. System according to claim 17, wherein a sine signal is obtained upon rotation of the coupling as:

$$V_2 = \left(\frac{V_{tt2}}{2}\right)\sin(\theta + \alpha_2) + V_{off2}$$

with corresponding peak to peak value of output signal $V_{tt2}$, a relative phase angle $\alpha_2$, and a constant offset fitting parameter $V_{off2}$.

19. System according to claim 18, wherein the peak to peak value for the offset is $$V_{tt2} = k_2 S + V_{20}.$$

20. System according to claim 1, wherein said reference sensor contains an accelerometer.

21. System according to claim 20, wherein said reference sensor generates a maximum accelerometer signal when the sensing direction of the accelerometer points straight toward a g-vector and the signal is lowest when the sensing direction is essentially antiparallel to the g-vector.

22. System according to claim 21, wherein the sensing direction of the accelerometer will be oriented radially in the coupling.

23. System according to claim 21, wherein the sensing direction of the accelerometer is oriented transversely in the coupling.

24. System according to claim 21, wherein a source in said reference sensor is fixed at one point and a detector is placed on the rotating shaft, or vice versa.

25. System according to claim 21, wherein the reference sensor is placed in association with the magnetic sensor system in a position where the other electronics is placed.

26. System according to claim 1, wherein said reference sensors contains optical transducers or magnetic ones.

27. System according to claim 1, wherein the reference sensor is placed at an arbitrary position, with known position and orientation in relation to the magnetic sensor system.

28. Biaxial orthogonal magnetic sensor system comprising a sensor and a magnet being arranged for forming part of a system for measuring alignment of two shafts provided with a first and a second coupling part,
said sensor being configured to be placed on the first coupling part with its one direction of sensing oriented in one direction of magnetization of said magnet, and
said magnet being configured to be placed on the other coupling part, wherein
said system comprises means for reading of an angular error and offset error independently of each other during the rotation of the shafts, and wherein the system moreover comprises a reference sensor for determining an orientation of said angular error and an orientation of said offset error relative to a known direction,
said magnetic sensor system being arranged for measuring the magnetic field in two orthogonal directions associated with said system for measuring the alignment of the two shafts.

29. Reference sensor for determining an angular error orientation and an offset error orientation relative to a known direction and adapted for forming part of a system for measuring the alignment of two shafts,
said system being provided with a first and a second coupling part by means of a biaxial orthogonal magnetic sensor system comprising a sensor and a magnet,
wherein said sensor is configured to be placed on the first coupling part with its one direction of sensing oriented in one direction of magnetization of said magnet, which magnet is configured to be placed on the other coupling part and said system also being provided with means for reading of an angular error and offset error independently of each other during the rotation of the shafts;
said reference sensor being positioned in a predetermined position in relation to said magnetic sensor system.

30. Method for measuring the relative parallel change in distance between the couplings by means of a system for measuring alignment of two shafts provided with a first and a second coupling part by means of a biaxial orthogonal magnetic sensor system comprising a sensor and a magnet, wherein said sensor is designed to be placed on the first coupling part with its one direction of sensing oriented in one direction of magnetization of said magnet, which magnet is designed to be placed on the other coupling part and means for reading of an angular error and offset error independently of each other during the rotation of the shafts, wherein the system moreover includes a reference sensor for determining an orientation of said angular error and an orientation of said offset error relative to a known direction, said method comprising the steps of
rotating the shafts of said system; and
determining any shifting in the distance between said couplings by detecting a change of working point defined by a mean value of the field changes obtained by said rotation of the shafts.

* * * * *

UNITED STATES PATENT AND TRADEMARK OFFICE
CERTIFICATE OF CORRECTION

PATENT NO.         : 8,633,685 B2
APPLICATION NO.    : 12/663291
DATED              : January 21, 2014
INVENTOR(S)        : Wipenmyr et al.

Page 1 of 1

It is certified that error appears in the above-identified patent and that said Letters Patent is hereby corrected as shown below:

In the Specification,

Detailed Description of the Preferred Embodiments, col 2, line 59 should read -- "For small angle errors (when .PHI.<<1), the angle error is given"

Detailed Description of the Preferred Embodiments, col 3, lines 23-24 should read -- "allow for the fact that we have slight angle errors, i.e., sin(.PHI./2)cos(.PHI.).apprxeq..PHI./2 when .PHI.<<1, we obtain:"

Detailed Description of the Preferred Embodiments, col 3, line 34 should read -- "the angle error were larger (i.e., .PHI. is not <<1), one can only use"

Detailed Description of the Preferred Embodiments, col 4, equation 6 should read -- "V.sub.tt1=k.sub.1.PHI.+V.sub.10"

Detailed Description of the Preferred Embodiments, col 4, equation 7 should read -- "B.sub.tt2=k.sub.SS"

Detailed Description of the Preferred Embodiments, col 5, equation 9 should read -- "V.sub.tt2=k.sub.2S+V.sub.20"

In the Claims,

Col 6, line 26 should read -- ".PHI. is given by"

Col 7, line 5 should read -- "V.sub.tt1=k.sub.1.PHI.+V.sub.10"

Signed and Sealed this
Sixteenth Day of June, 2015

Michelle K. Lee
*Director of the United States Patent and Trademark Office*